April 9, 1940. N. FRIES 2,196,765
FISHLINE REEL
Filed Aug. 4, 1938 2 Sheets-Sheet 1
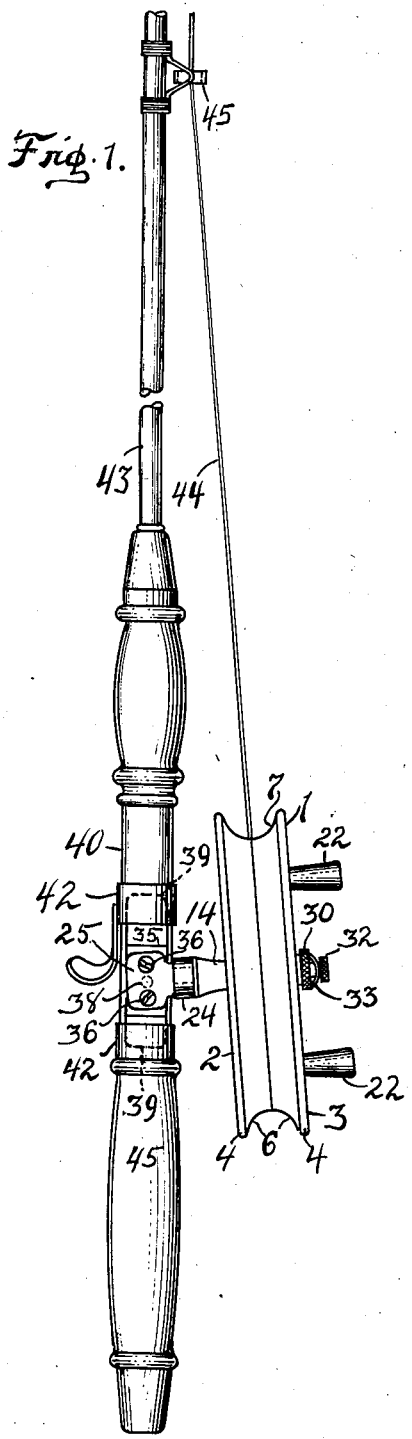
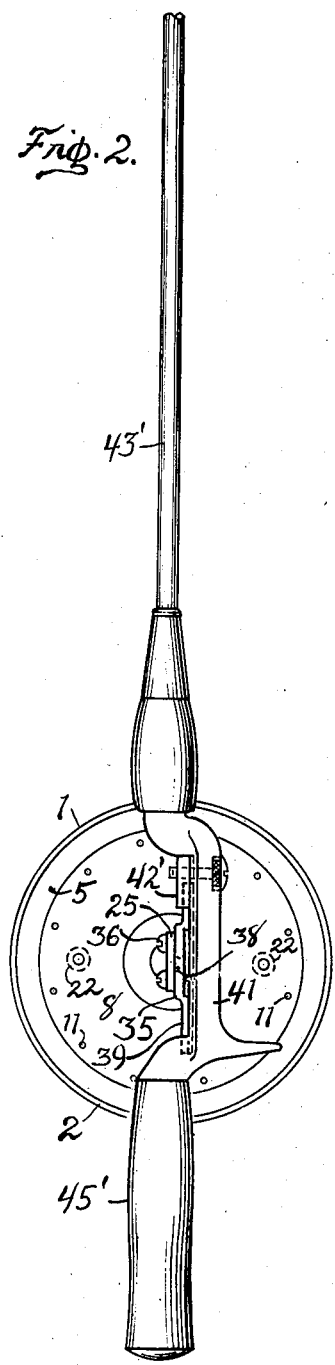
INVENTOR.
Nestor Fries
BY
ATTORNEY.

April 9, 1940.  N. FRIES  2,196,765
FISHLINE REEL
Filed Aug. 4, 1938  2 Sheets-Sheet 2
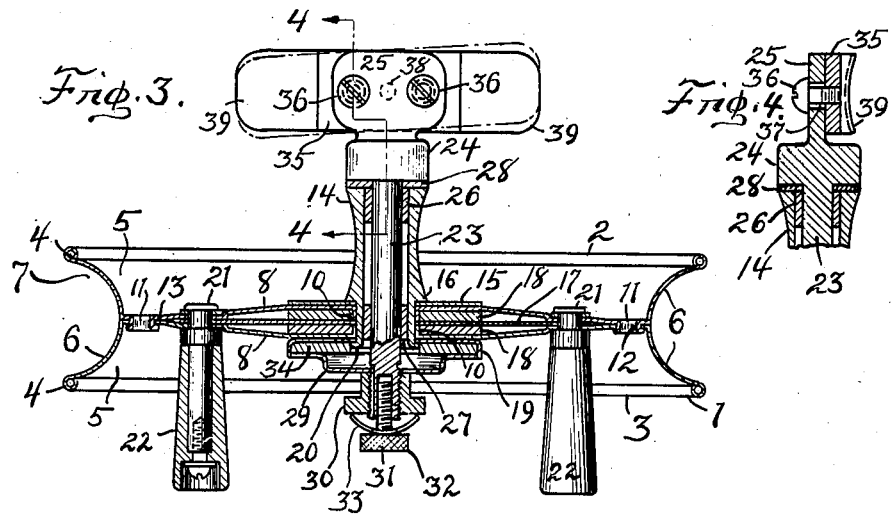
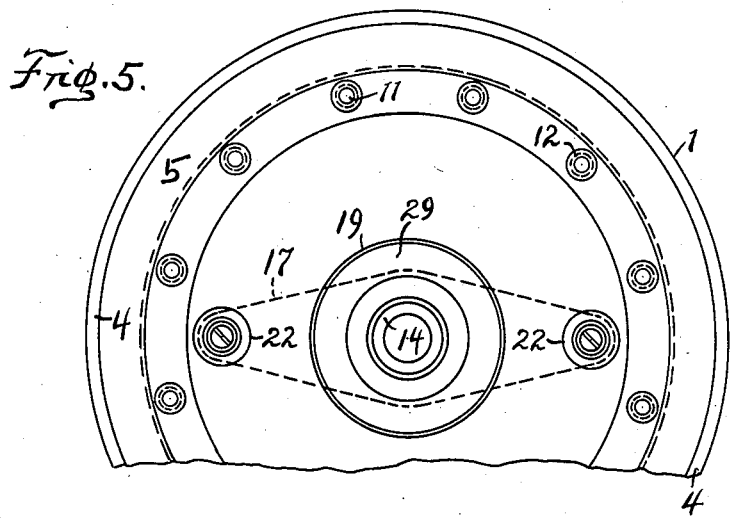
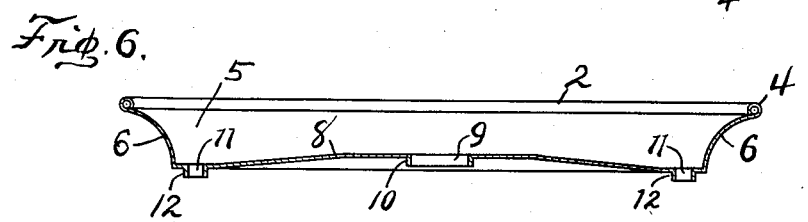
INVENTOR.
Nestor Fries
BY H. G. Burns ATTORNEY.

Patented Apr. 9, 1940

2,196,765

UNITED STATES PATENT OFFICE 2,196,765

FISHLINE REEL

Nestor Fries, Fort Wayne, Ind.

Application August 4, 1938, Serial No. 223,064

10 Claims. (Cl. 242—84.5)

This invention relates to fishline reels of that type that is ordinarily used on a casting or fly-rod and provided with a spool operated by handles secured directly to the spool structure which is rotatably mounted upon a post attached to the shank of the rod.

Equipment of this character frequently is employed continuously over protracted periods of time, and the weight of the reel thereupon becomes a factor because, if the reel is heavy, more or less fatigue is experienced by the fisherman. Also, because of its weight, the reel tends to overrun, due to momentum, causing premature unreeling of the line and consequent entanglement thereof.

Another matter of importance is in the strength of the reel and its mounting. For instance, when a large active fish is hooked, the draft on the line becomes more or less violent and irregular, causing strain on the reel upon which the line is wound, and therefore stability of the reeling appliance is highly essential.

An object of the present invention is to provide a reel that is both light in weight and of extreme strength.

Another object of the invention is to afford a reel provided with an adjustable mounting therefor so constituted that it is equally adaptable for attachment to rods having either a straight or an offset shank, such as are in common use.

And a further object of the invention is to provide a readily adjustable means in connection with the reel and its supporting fixture by which it is attached to the rod, whereby more or less frictional restraint to the rotary movement of the reel is adjustably applied.

Other objects and advantages in the construction of the appliance appear in the following description.

An illustrative embodiment of the invention is shown in the accompanying drawings, in which:

Fig. 1 is a plan view of a structure embodying the invention applied to a rod of the usual type having a straight shank;

Fig. 2 is a similar view of the reel applied to a rod having an offset shank the reel being in a plane at right angles to that of Fig. 1;

Fig. 3 is another plan view of the reel structure in which the invention is embodied, parts thereof being broken away;

Fig. 4 is a detail view showing a section of Fig. 3 on the line 4—4 thereof;

Fig. 5 is a fragmentary end view of the spool for the reel structure; and

Fig. 6 is a diametrical section through one of the spool members.

The invention as illustrated is constituted of a spool 1 made up of two circular discs 2 and 3 formed of thin light sheet metal, such as aluminum. The discs are disposed axially opposite each other and have beads 4 formed around their outermost perimeters that terminate from flanges 5 which have external concave faces 6 so that when said discs are positioned oppositely in connection with each other said faces converge and an annular channel 7 therebetween is established.

A medial portion 8 of each disc between its flange 5 and its axis is bulged outwardly and its central portion has formed therein an opening 9 surrounded by an inturned extrusion constituting a hub flange 10. Also, there are made in one of said discs 2 an annular series of similar openings 11 surrounded respectively by extrusions 12 that are adapted to be projected through openings 13 made in the opposite disc 3, when said discs are fitted together, and clinched thereby to secure said discs permanently together in axial alinement.

The discs 2 and 3 are assembled upon a hub 14 the outer end portion of which extends through the openings 9 in each of the discs and fits snugly within the hub flanges 10 thereof. Also, there is assembled on the hub a clamp-disc 15 that faces against the outer wall of the disc 2 and underlies a shoulder 16 on said hub. Upon the outer portion of said hub there is mounted a crank-bar 17 disposed in a plane between said discs, and also upon the hub are assembled and located between the inner faces of said discs and the crank-bar 17, spacers 18 that snug closely around the flanges 10 on the discs 2 and 3.

Upon the outer portion of the hub 14 is mounted a cup 19 that is held against the outer face of the disc 3 by the clinch 20 on the outer end of the hub 14, by which the assemblage of the clamp-plate 15, discs 2 and 3, crank-bar 17, spacers 18 and the cup 19 are firmly fixed between said clinch and the shoulder 16 on the hub. Also, after these parts are assembled on the hub and the outer end of the hub and the extrusions 12 are clinched, great rigidity is established in the reel structure which is enhanced by the close confinement of the hub flanges 10 on the discs between the hub and the bore faces of the spacers 18.

The outer ends of the crank-bar 17 and the discs 2 and 3 have secured therein stems 21 by which they are clamped together, and said stems extend outwardly parallel with the axis of the hub, and have loosely mounted thereon corresponding handles 22 by which to manipulate the reel.

The reel thus formed is provided with a mount constituted of a spindle 23 having a shoulder 24 and a base-plate 25 at one end thereof. The hub of the reel has in its opposite ends corresponding bushings 26 and 27, preferably formed of non-frictional metal, and when the reel is mounted the spindle extends concentrically through said bearings. There is also disposed loosely on the spindle between the inner end of the hub 14 and the shoulder 24, a drag-washer 28 made of suitable material such as to obviate direct contact with and friction between the hub and shoulder.

The outer end of the spindle is threaded and has splined thereon a pressure-plate 29, and an adjusting nut 30 threaded on the spindle bears against the outer face of said plate. The spindle 23 has at its outer end a stop consisting of a screw 31 that is threaded in the outer end of the spindle and is provided with a head 32, and between said head and the outer end of the adjusting nut 30 is interposed an arched spring washer 33 that serves yieldingly to frictionally resist rotation of the adjusting nut 30. Also, a floating brake-cushion 34, such as a felt washer is disposed concentrically with respect to the spindle within the cup 19, and the pressure plate 29 bears against said cushion, compressing it more or less within said cup, according to adjustments of the nut 30 on the spindle. Preferably, the threads on the spindle and in the adjusting nut are cut sufficiently deep as to afford slight axial play between the nut and spindle, thus permitting the nut to be delicately adjusted by turning it on the spindle while the play is taken up by action of the spring washer 33 which tends to hold the nut in its adjusted positions. By this means more or less spring pressure is maintained against the brake-cushion 34, or the pressure is removed therefrom entirely dependent upon adjustment of the nut 30.

The base-plate 25 on the spindle is adjustably attached to a supporting bracket 35 by means of clamp-screws 36 threaded in said bracket and which extend through openings 37 respectively in said plate, the openings being of sufficient size as to permit limited maneuvering of the plate on the bracket. The plate 25 has a pintle 38 that extends through the bracket 35, upon which the spindle 23 for the reel adjustably swings. By this arrangement the spindle together with the reel mounted thereon are adjustably moved relative to the supporting bracket 35 about the pintle 38 and are secured in adjusted positions on the bracket by tightening the screws 36.

The bracket 35 had end wings 39 by which the appliance is attached to the shank 40 or 41 of a fishing-rod by means of the usual retaining fasteners 42—42' with which fish-rods ordinarily are equipped.

*Operation*

In use, the appliance is mounted, for instance, upon the fish-rod 43 (Fig. 1) by securing the wings 39 of the bracket 35 on the shank 40 by the retaining fasteners 42. The spindle is then swung upon the pintle 38 adjustably to such position that the fishline 44 is angularly alined with respect to the axis of the spool to which the line is attached and the eye 45 on the rod through which the line passes. The spindle is then secured in its adjusted position by tightening the screws 36, thus is assured proper reeling of the line upon the spool when manipulated in one direction by operating one or the other of the handles. Unreeling of the line occurs when casting a bait (not shown) attached to the outer end of the line, or upon retreat of a hooked fish which causes pull on the line. The unreeling action is hindered more or less, when desired, by turning the adjusting nut 30 on the spindle toward or from the pressure plate, thus to cause or relieve frictional resistance to turning movement of the spool. Also, rotation of the spool is retarded more or less by applying pressure with the thumb of the operator upon the hub 14 which is located near the handle 45 on the rod within convenient reach.

Should it be desired to permit free turning movement of the spool, the thumb-nut 30 is turned outwardly in opposition to the tension of the spring washer 33, where it is thereby frictionally held without action against the pressure-plate, whereupon the brake-cushion is relieved from restraint and the spool rotates with full freedom.

As shown in Fig. 2, the rod 43' has a handle 45' provided with a shank 41 that is offset. In this type of rod the bracket 35 is set within the offset 41 and secured therein by a clip 42' so that the axis of the spindle is at right angles to the offset which is a convenience for this type of rod, as the reel is attached to the shank without requirement of an adapter as is ordinarily required for interchange of rods of the several common types with the reel.

Variations from the particular construction above disclosed may readily be made by exercise of engineering skill without departure from the spirit or scope of the invention, and the following claims are intended to be inclusive of such variations.

What I claim is:

1. A fishline reel constituted of a spool formed of two oppositely disposed discs on a hub, one of said discs having an annular series of extrusions that extend through corresponding openings in the other disc, each of said discs having a central opening surrounded by an inwardly extending flange, a medial annular portion of each disc being bulged outwardly, a crank-bar disposed on said hub between the discs together with spacers located respectively between said crank-bar and corresponding discs, a clamp-plate on the hub opposing the outer face of the innermost of said discs, a cup on the hub opposing the outer face of the outermost disc, said extrusions and the outer end of said hub being clinched over the parts adjacent thereto thereby to secure the assemblage of the clamp-plate, discs, crank-bar, spacers and said cup rigidly together, stems secured in connection with said crank-bar and discs provided with handles thereon, a spindle upon which the hub is rotatably mounted, a brake-cushion in said cup, a pressure plate splined on said spindle adapted to act against said cushion, an adjusting nut on said spindle engageable with said plate, a stop on the outer end of said spindle, and a compression member disposed on the spindle between said stop and adjusting nut.

2. In a fishline reel, a spool formed of two oppositely disposed discs on a hub, one of said discs having an annular series of extrusions that extend through corresponding openings in the other disc, the outer peripheral portions of said discs being shaped to form a line-receiving groove, the centers of said discs having openings made therein with surrounding inturned flanges, a medial annular portion of each disc being bulged outwardly, a crank-bar disposed on said hub between the discs together with spacers located respectively between said crank-bar and corresponding discs closely encompassing said flanges, a clamp-plate on the hub opposing the outer face of the innermost of said discs, a cup on the hub opposing the outer face of the outermost disc, said extrusions and the outer end of said hub being clinched outwardly over the parts adjacent thereto thereby to secure the assemblage of the clamp-plate, discs, crank-bar, spacers and cup rigidly together, stems secured in connection with said crank-bar and discs provided with handles thereon, a spindle upon which the hub is rotatably mounted having supporting means therefor, a brake-cushion in said cup, and means including a pressure plate engageable with said brake-cushion and including adjusting means applicable thereto whereby to restrain or permit free rotary movement of the spool on said spindle.

3. In a fishline reel, a spool formed of two oppositely disposed discs and a hub therefor, the outer peripheral portions of said discs being shaped to form a line-receiving groove therebetween, the centers of said discs having hub openings therein with surrounding flanges, a medial annular portion of each disc being bulged, a crank-bar provided with handles attached thereto secured in connection also with said discs, spacers located between said discs closely encompassing said flanges, a cup on said hub, means for clamping said hub, cup, discs and spacers rigidly together, a spindle upon which the hub is rotatively mounted having supporting means therefor, a brake-cushion in said cup, and means including a pressure plate engageable with said brake-cushion including adjusting means applicable thereto whereby to restrain or permit free rotary movement of the spool on said spindle.

4. In a fishline reel, a spool formed of two oppositely disposed discs on a hub provided therefor, the outer portions of said discs being shaped to form a line-receiving groove therebetween, the centers of said discs having hub openings therein with surrounding flanges, a crank-bar on said hub between said discs together with spacers closely encompassing said flanges, handles secured in connection with said discs and crank-bar for operating the spool, clamping means for securing said hub, discs, crank-bar and spacers rigidly together, a spindle extending through said hub forming a mount for said spool, and means on said spindle adapted to restrain or permit free rotary movement of the spool on said spindle.

5. In a fishline reel, a spool formed of two oppositely disposed discs on a hub provided therefor, the outer portions of said discs being shaped to form a line-receiving groove therebetween, the centers of said discs having hub openings therein with surrounding flanges, spacers located between said discs and closely encompassing said flanges, handles secured in connection with said discs for operating the spool, clamping means for securing said hub, discs and spacers rigidly together, a spindle on which said spool is rotatively mounted, and means in connection with said spindle to restrain or permit free rotary movement of the spool on said spindle.

6. A fishline reel having a spindle and spool mounted thereon for rotary movement, said spool being formed of a hub having an annular shoulder, two discs of thin sheet metal the outer portions of which are shaped to form a line-receiving groove therebetween and the centers of which have hub openings therein with surrounding flanges, spacers between the discs closely encompassing said flanges, a clamp-plate on the hub between said shoulder and the adjacent disc, a cup on the hub adjacent the outer face of the outermost disc, an annular series of extrusions on one of said discs that extend through corresponding openings in the other disc, the outer ends of said extrusions being clinched thereby to secure the outer marginal portions of said discs firmly together, the outer end of said hub being clinched outwardly over the outer face of said cup thereby to clamp the central portion of said discs and said spacers rigidly between said shoulder and the clinched end of said hub, handles the stems of which are secured to said spool for operating same, and means in connection with said spindle to restrain or permit rotary movement of said spool according to adjustment of said means on the spindle.

7. A spool for a fishline, said spool being formed of a hub provided with a bore for receiving a supporting spindle, two discs made of thin sheet metal, the outer portions of which are shaped to form a line-receiving groove therebetween and the centers of which have hub openings therein with surrounding flanges, a crank-bar on said hub located between said discs, spacers located between the opposite faces of said crank-bar and the adjacent discs closely encompassing said flanges, means for clamping said discs, crank-bar and spacers rigidly together upon said hub, another means for securing the outer portions of said discs together, and handles the stems of which are secured to said discs and the intervening crank-bar.

8. A spool for a fishline reel, said spool being formed of a hub provided with a bore for receiving a supporting spindle, two discs made of thin sheet metal, the outer portions of which are shaped to form a line-receiving groove therebetween and the centers of which have hub openings therein with surrounding flanges, spacers located between said discs closely encompassing said flanges, means for clamping said discs, spacers and hub rigidly together, other means for securing the outer portions of said discs together, and handles for operating the spool the stems of which are secured to said discs.

9. A fishline reel having a spindle and a spool rotatively mounted thereon, a brake member secured to said spool, a pressure plate splined on said spindle acting against said brake member, an adjusting nut threaded on said spindle for said pressure plate, a stop on the outer end of said spindle, and an arched spring member disposed between said adjusting nut and stop for taking up axial play of said adjusting nut on the spindle and restraining turning movement of said adjusting nut thereon.

10. A fishline reel having a spindle provided with means for attachment thereof to a fish-rod, a spool rotatively mounted on said spindle, a brake means on the spindle engageable with said spool for more or less restraining rotary movement thereof, an adjusting nut loosely threaded on said spindle thereby to permit angular and limited axial movement of the nut on said spindle for controlling said brake means, a stop on the outer end of said spindle, and a spring compression member disposed between said adjusting nut and stop adapted to take up axial play of said adjusting nut on the spindle and restrain turning movement of said adjusting nut thereon.

NESTOR FRIES.